US012630257B2

(12) United States Patent
Obayashi et al.

(10) Patent No.: US 12,630,257 B2
(45) Date of Patent: May 19, 2026

(54) VEHICLE CONTROLLER AND VEHICLE CONTROL METHOD

(71) Applicant: KAWASAKI MOTORS, LTD., Akashi (JP)

(72) Inventors: Kosuke Obayashi, Kobe (JP); Koshi Fusazaki, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 0 days.

(21) Appl. No.: 18/481,974

(22) Filed: Oct. 5, 2023

(65) Prior Publication Data

US 2024/0199169 A1    Jun. 20, 2024

(30) Foreign Application Priority Data

Dec. 14, 2022    (JP) ................................. 2022-199306

(51) Int. Cl.
  B62M 23/02        (2010.01)
  B62J 45/414        (2020.01)
(52) U.S. Cl.
  CPC ............. B62M 23/02 (2013.01); B62J 45/414 (2020.02)
(58) Field of Classification Search
  CPC ....... B62M 23/02; B62J 45/414; B60K 26/02; B60L 15/209; B60L 2200/12; B60L 2240/12; B60L 2240/14; B60L 15/2072; B60L 2240/423; B60L 2240/433; B60L 2250/16; B60L 2250/28; B60L 2260/10; B60L 2260/26; B60W 20/19; B60W 2050/146; B60W 2520/04; B60W 2520/10; B60W 2710/0666; B60W 2710/083; B60W 30/188; B60W 20/15; B60W 10/06; B60W 10/08; B60W 2300/36; B60W 2510/0638; B60W 2510/087; B60W 2510/1005; B60W 2510/242; B60W 2510/246; B60W 2556/50; B60Y 2540/10; B60Y 2200/12
(Continued)

(56) References Cited

U.S. PATENT DOCUMENTS

2008/0114521 A1    5/2008  Doering
2011/0192662 A1*   8/2011  Hennings ................. B60K 6/30
                                              903/903
(Continued)

FOREIGN PATENT DOCUMENTS

JP        2002369316 A    12/2002
JP        2007245779 A    9/2007
JP        2013520351 A    6/2013

*Primary Examiner* — Yi-Kai Wang
(74) *Attorney, Agent, or Firm* — Alleman Hall LLP

(57)        ABSTRACT

Processing circuitry is configured such that: when a boost request is not being generated, the processing circuitry determines, as target torque of a prime mover in accordance with a normal rule, normal torque which corresponds to an acceleration request amount; when the boost request is generated under a first condition, the processing circuitry determines, as the target torque of the prime mover in accordance with a first boost rule, first boost torque obtained by adding first additional torque to the normal torque; and when the boost request is generated under a second condition different from the first condition, the processing circuitry determines, as the target torque in accordance with a second boost rule different from the first boost rule, second boost torque obtained by adding second additional torque to the normal torque.

18 Claims, 9 Drawing Sheets

(58) Field of Classification Search
USPC .......................................................... 701/70
See application file for complete search history.

(56) References Cited

U.S. PATENT DOCUMENTS

2020/0307388 A1 * 10/2020 Huang ................... B60L 15/209
2022/0274615 A1    9/2022 Kumagai et al.
2023/0211700 A1 *  7/2023 Jeoung ................... B60L 58/12
                                                701/22

* cited by examiner

1

VEHICLE CONTROLLER AND VEHICLE CONTROL METHOD

CROSS-REFERENCE TO RELATED APPLICATIONS

This application claims priority to and the benefit of Japanese Patent Application No. 2022-199306 filed on Dec. 14, 2022, the entire disclosure of which is incorporated herein by reference.

BACKGROUND OF THE INVENTION

Field of the Invention

The present disclosure relates to a vehicle controller and a vehicle control method.

Description of the Related Art

Japanese Laid-Open Patent Application Publication No. 2002-369316 discloses boost control by which a current that exceeds a maximum current of a motor of an electric vehicle is supplied to the motor for a predetermined period of time. In this boost control, a boost current corresponding to an acceleration state is added to a current command value which corresponds to an accelerator opening degree and is a command value of a current supplied to the motor.

However, boost torque output from the motor by the boost control may deteriorate driving feeling depending on the situation. On the other hand, when the driving feeling is prioritized, and opportunities to allow the boost control are excessively limited, rider's requests are not adequately satisfied.

SUMMARY OF THE INVENTION

An object of one aspect of the present disclosure is to satisfy a boost request while realizing appropriate driving feeling depending on the situation.

A vehicle controller according to one aspect of the present disclosure is a vehicle controller that controls a vehicle. The vehicle includes: a driving wheel; an accelerator opening degree sensor that detects an acceleration request amount of a rider; and a prime mover that generates torque to be transmitted to the driving wheel in accordance with the acceleration request amount detected by the accelerator opening degree sensor. The vehicle controller includes processing circuitry configured to control the prime mover. When a boost request is not being generated, the processing circuitry determines, as target torque of the prime mover in accordance with a normal rule, normal torque which corresponds to the acceleration request amount. When the boost request is generated under a first condition, the processing circuitry determines, as the target torque of the prime mover in accordance with a first boost rule, first boost torque obtained by adding first additional torque to the normal torque. When the boost request is generated under a second condition different from the first condition, the processing circuitry determines, as the target torque in accordance with a second boost rule different from the first boost rule, second boost torque obtained by adding second additional torque to the normal torque.

A vehicle controller according to another aspect of the present disclosure is a vehicle controller that controls a vehicle. The vehicle includes: a driving wheel; an accelerator opening degree sensor that detects an acceleration request amount of a rider; a prime mover that generates torque to be transmitted to the driving wheel in accordance with the acceleration request amount detected by the accelerator opening degree sensor; and a display. The vehicle controller includes processing circuitry configured to control the prime mover. When a boost request is not being generated, the processing circuitry determines, as target torque of the prime mover in accordance with a normal rule, normal torque which corresponds to the acceleration request amount. When the boost request is generated under a condition that it has been determined that the vehicle is in a stop state, the processing circuitry makes an informer output information indicating that boost control is standing by. When it has been determined that the vehicle has started traveling in a state where the informer is outputting the information, the processing circuitry determines, as the target torque in accordance with a boost rule, boost torque obtained by adding additional torque to the normal torque.

A vehicle control method according to one aspect of the present disclosure is a method of controlling a vehicle. The vehicle includes: a driving wheel; an accelerator opening degree sensor that detects an acceleration request amount of a rider; and a prime mover that generates torque to be transmitted to the driving wheel in accordance with the acceleration request amount detected by the accelerator opening degree sensor. The method includes: when a boost request is not being generated, determining, as target torque of the prime mover in accordance with a normal rule, normal torque which corresponds to the acceleration request amount; when the boost request is generated under a first condition, determining, as the target torque in accordance with a first boost rule, first boost torque larger than the normal torque; and when the boost request is generated under a second condition different from the first condition, determining, as the target torque in accordance with a second boost rule different from the first boost rule, second boost torque that is larger than the normal torque and different from the first boost torque.

DETAILED DESCRIPTION

Hereinafter, an embodiment will be described with reference to the drawings. Directions used in the following description are based on directions when viewed from a rider who is riding a motorcycle 1. To be specific, a vehicle longitudinal direction is a front-rear direction, and a vehicle width direction is a left-right direction.

Figure 1:
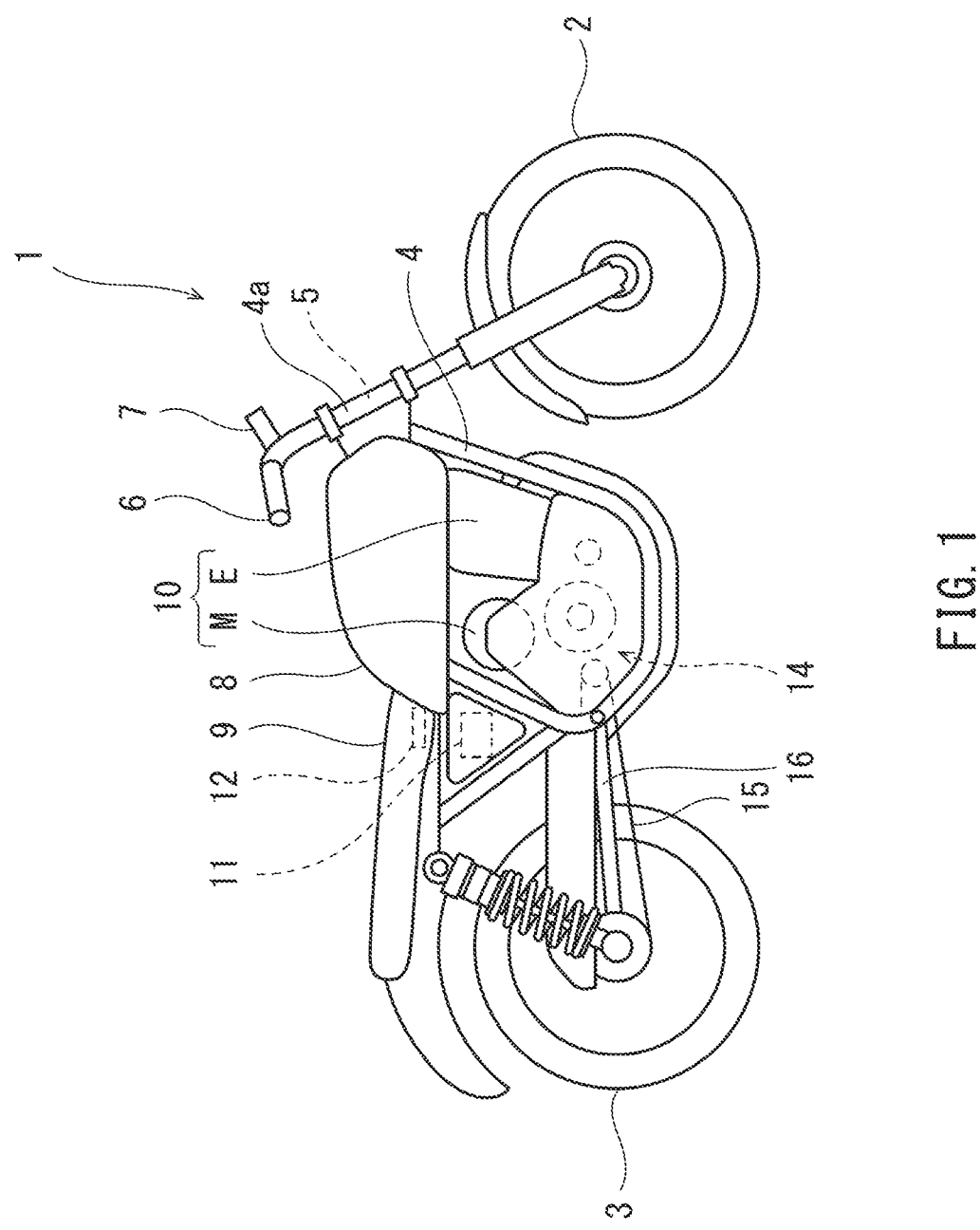
FIG. 1 is a side view of a motorcycle according to an embodiment.

FIG. 1 is a side view of the motorcycle 1 according to the embodiment. As shown in FIG. 1, the motorcycle 1 is one example of a straddled vehicle straddled by the rider. The motorcycle 1 is a hybrid vehicle but may be an electric vehicle including only an electric motor as a traveling driving source or an engine vehicle including only an internal combustion engine as the traveling driving source. The vehicle is not limited to the motorcycle. Examples of the vehicle include an electric bicycle, an automatic three-wheeled vehicle, and an automatic four-wheeled vehicle.

The motorcycle 1 includes: a front wheel 2 as a driven wheel; a rear wheel 3 as a driving wheel; and a vehicle body frame 4 supported by the front wheel 2 and the rear wheel 3. The vehicle body frame 4 includes a head pipe 4a and a main frame 4b extending rearward from the head pipe 4a. A steering shaft 5 is rotatably inserted into the head pipe 4a. A bar-shaped handle 6 held by the rider with both hands is located at the steering shaft 5. A display 7 is located in the vicinity of the handle 6. A fuel tank 8 is located behind the handle 6. A seat 9 on which the rider is seated is located behind the fuel tank 8. A prime mover assembly 10 is mounted on the vehicle body frame 4 so as to be located between the front wheel 2 and the rear wheel 3.

The prime mover assembly 10 includes an internal combustion engine E and an electric motor M as prime movers. The motorcycle 1 includes a battery 11 and a vehicle controller 12. The battery 11 stores electric power to be supplied to the electric motor M. The vehicle controller 12 controls the internal combustion engine E and the electric motor M. The electric motor M generates driving force by the electric power discharged from the battery 11 and generates the electric power by being supplied with the driving force from an outside. A transmission 14 is located behind the internal combustion engine E. The transmission 14 changes the speed of the power output from the internal combustion engine E and the electric motor M. The power output from the transmission 14 is transmitted to the rear wheel 3 through an output transmitting structure 15, such as a chain or a belt. A swing arm 16 that supports the rear wheel 3 and extends in the front-rear direction is supported by the vehicle body frame 4 so as to be angularly displaceable.

Figure 2:
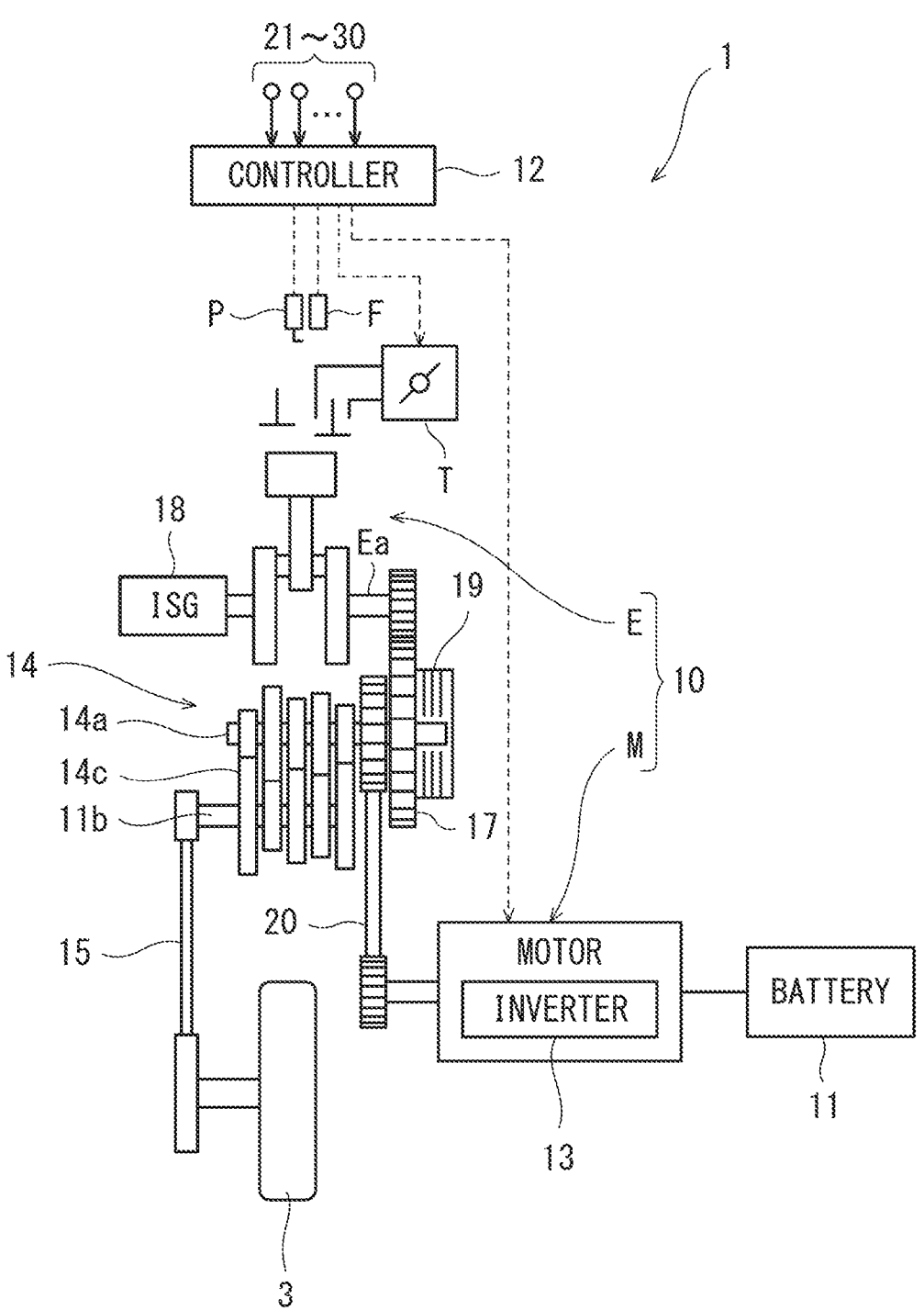
FIG. 2 is a schematic diagram of a power system of the motorcycle of FIG. 1.

FIG. 2 is a schematic diagram of a power system of the motorcycle 1 of FIG. 1. As shown in FIG. 2, a throttle T, a fuel injector F, and an ignition plug P are located at the internal combustion engine E. The throttle T is a valve that adjust an intake air amount of the internal combustion engine E. The fuel injector F injects fuel, stored in the fuel tank 8, into an intake passage of the internal combustion engine E. The ignition plug P ignites a fuel-air mixture in a combustion chamber of the internal combustion engine E. The battery 11 is electrically connected to the electric motor M. The electric motor M includes an inverter 13, but the inverter 13 may be located outside the electric motor M.

The vehicle controller 12 controls the internal combustion engine E and the electric motor M based on information from sensors 21 to 30. The vehicle controller 12 can increase torque output from the electric motor M by increasing a current supplied to the electric motor M. The vehicle controller 12 can increase the torque output from the internal combustion engine E by controlling the throttle T to increase the intake air amount. In this case, to maintain an air-fuel ratio, the vehicle controller 12 controls the fuel injector F to increase a fuel injection amount in accordance with an increase in the intake air amount.

The transmission 14 includes an input shaft 14a, an output shaft 14b, and gear trains 14c having respective reduction ratios different from each other. In the transmission 14, power is transmitted from the input shaft 14a to the output shaft 14b through the gear trains 14c. Any one of the gear trains 14c is selected, and with this, the speed of the transmitted power is changed. One end portion of a crank shaft Ea of the internal combustion engine E is connected to a primary gear 17. The other end portion of the crank shaft Ea is connected to an integrated starter generator 18. The crank shaft Ea is connected to a main clutch 19 through the primary gear 17. The main clutch 19 is connected to the input shaft 14a. To be specific, the crank shaft Ea transmits the power to the input shaft 14a through the primary gear 17 and the main clutch 19.

A driving shaft of the electric motor M is connected to the input shaft 14a through a power transmitting structure 20, such as a chain, a belt, or a gear. The internal combustion engine E and the electric motor M are connected to the input shaft 14a of the transmission 14 in parallel. The rear wheel 3 is driven by at least one of the driving force of the internal combustion engine E or the driving force of the electric motor M. To be specific, the motorcycle 1 is a parallel hybrid vehicle.

Figure 3:
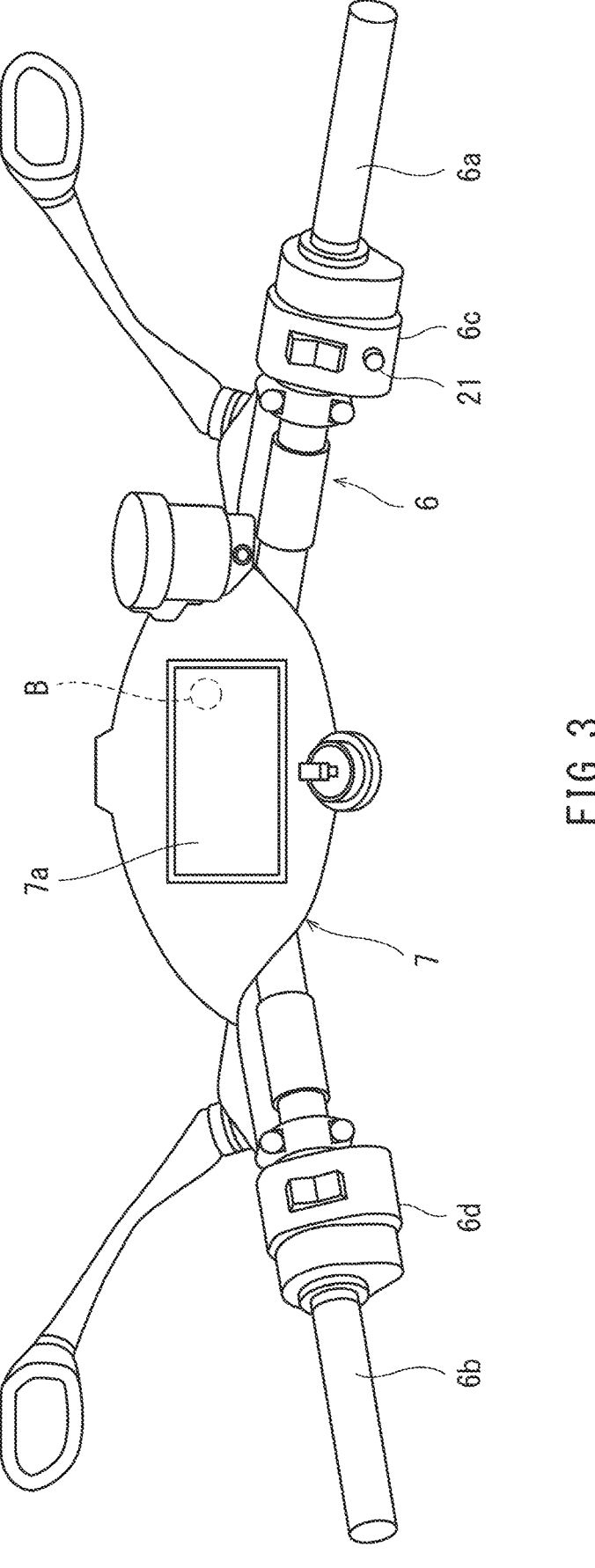
FIG. 3 is a diagram showing a handle and meter of the motorcycle of FIG. 1 when viewed from a rider.

FIG. 3 is a diagram showing the handle 6 and display 7 of the motorcycle 1 of FIG. 1 when viewed from the rider. As shown in FIG. 3, the handle 6 is a bar handle. The handle 6 includes: a right grip 6a held by the rider with his/her right hand; and a left grip 6b held by the rider with his/her left hand. The right grip 6a is an accelerator grip and turns by twisting of a wrist of the rider. The handle 6 includes: a right base 6c adjacent to a left-right direction middle side of the right grip 6a; and a left base 6d adjacent to a left-right direction middle side of the left grip 6b.

A boost switch 21 to which the rider inputs a boost command is located at the right base 6c or the left base 6d. The boost switch 21 is located at the handle 6 separately from the right grip 6a that is an accelerator operating member. The boost switch 21 is operatable between an OFF position and an ON position and is being biased toward the OFF position. For example, the boost switch 21 is a push button switch, is operatable between a push-up position as the OFF position and a push-down position as the ON position, and is being biased by a spring toward the push-up position. The boost switch 21 may be a known push button switch configured such that: when the switch is operated once, the switch is held at the ON position; and when the switch is operated once again, the switch returns to the OFF position.

The display 7 is located between the right grip 6a and the left grip 6b in the left-right direction. The display 7 may be a display device, such as a liquid crystal display, an organic EL display, a projector, or an LED. Instead of the display located in the vicinity of the handle 6, the display 7 may be a head mount display or a VR display.

The display 7 displays a display mode indicating that normal control is being executed, a display mode indicating that boost control is being executed, or a display mode indicating that the boost control is standing by. These three display modes are different from each other. To be specific, the display 7 serves as an informer that informs the rider of the state of the boost control. For example, the display 7 includes a screen 7a that can display boost display B that is a predetermined mark. The boost display B can present display modes including light-off, light-on, and flashing. In the present embodiment, the light-off of the boost display B indicates that the normal control is being executed. The light-on of the boost display B indicates that the boost control is being executed. The flashing of the boost display B indicates that the boost control is standing by.

Figure 4:
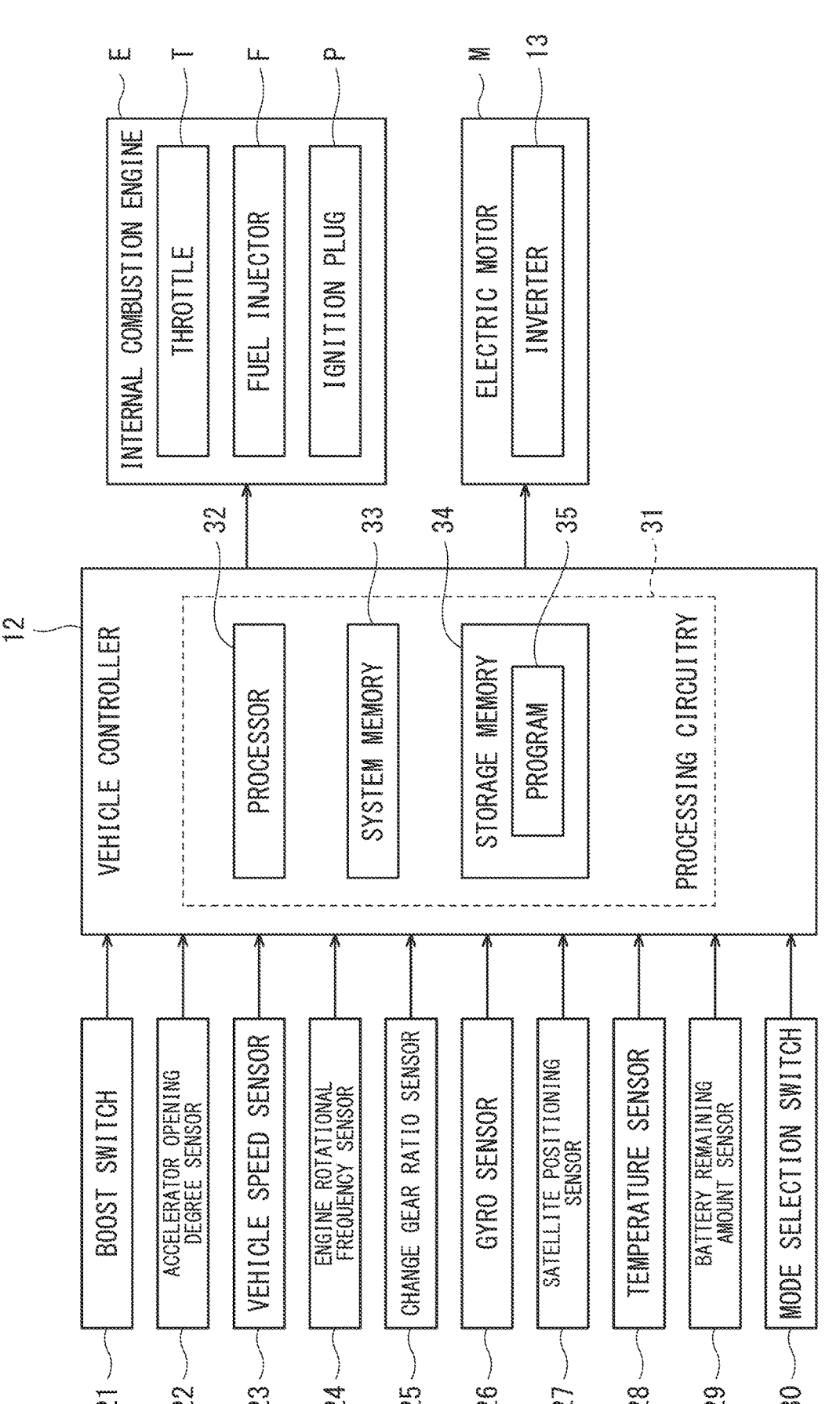
FIG. 4 is a block diagram of a control system of the motorcycle of FIG. 1.

FIG. 4 is a block diagram of a control system of the motorcycle 1 of FIG. 1. As shown in FIG. 4, the boost switch 21, an accelerator opening degree sensor 22, a vehicle speed sensor 23, an engine rotational frequency sensor 24, a change gear ratio sensor 25, a gyro sensor 26, a satellite positioning sensor 27, a temperature sensor 28, a battery remaining amount sensor 29, and a mode selection switch 30 are connected to an input side of the vehicle controller 12. The internal combustion engine E and the electric motor M are connected to an output side of the vehicle controller 12. The sensors and the switch other than the boost switch 21 are optional and are not especially limited.

The boost switch 21 can be turned on or off by the rider. When the boost switch 21 is turned on by the rider, the boost switch 21 inputs a boost request to the vehicle controller 12. The accelerator opening degree sensor 22 detects an accelerator opening degree that is an accelerator operation amount of the right grip 6a. The accelerator opening degree is an opening degree percentage on the basis that the fully-closed accelerator opening degree is regarded as 0%, and the fully-open accelerator opening degree is regarded as 100%. The accelerator opening degree denotes an acceleration request amount requested by the rider. The rider increases the accelerator operation amount to perform an input of increasing the acceleration request amount. The accelerator opening degree sensor 22 inputs to the vehicle controller 12 a signal that changes in accordance with the accelerator operation amount. The vehicle speed sensor 23 detects a traveling speed of the motorcycle 1. For example, the vehicle speed sensor 23 may be a sensor that detects a rotational frequency of the front wheel 2. The engine rotational frequency sensor 24 detects a rotational frequency of the crank shaft Ea of the internal combustion engine E. The change gear ratio sensor 25 detects a change gear ratio of the transmission 14. For example, the change gear ratio sensor 25 may be a sensor that detects a phase angle of a shift drum of the transmission 14.

The gyro sensor 26 detects an angular velocity of the motorcycle 1. The satellite positioning sensor 27 communicates with a satellite positioning system, such as the GPS, to detect the position of the motorcycle 1. The temperature sensor 28 detects the temperature of the electric motor M or the temperature of the battery 11. The battery remaining amount sensor 29 detects a remaining amount of the battery 11. The mode selection switch 30 allows the rider to select one of traveling modes. When the rider selects one of the traveling modes, the mode selection switch 30 inputs to the vehicle controller 12 a command that requests traveling corresponding to the selected traveling mode. For example, the traveling modes may include: an EV mode in which the motorcycle 1 travels only by the driving force of the electric motor M without using the internal combustion engine E; and an HEV mode in which the motorcycle 1 travels by both of the driving force of the internal combustion engine E and the driving force of the electric motor M.

The vehicle controller 12 includes a processor 32, a system memory 33, and a storage memory 34. The processor 32 is, for example, a CPU. The system memory 33 is, for example, a RAM. The storage memory 34 is an example of a computer-readable medium, and is a non-transitory and tangible medium. The storage memory 34 may include a ROM. The storage memory 34 may include a hard disk, a flash memory, or a combination thereof. The storage memory 34 stores a program 35. A configuration in which the processor 32 executes the program 35 that has been read out by the system memory 33 is one example of processing circuitry 31.

The processor 32 controls the throttle T, the fuel injector F, and the ignition plug P to control the internal combustion engine E. The processor 32 controls the inverter 13 to control the electric motor M. The program 35 includes a normal control map for the normal control, a first boost control map for first boost control, and a second boost control map for second boost control. The normal control map, the first boost control map, and the second boost control map are respectively one example of a normal rule, one example of a first boost rule, and one example of a second boost rule. The first boost control may be referred to as vehicle-start boost control, and the second boost control may be referred to as traveling boost control.

Each control map defines a correspondence relation between the accelerator opening degree detected by the accelerator opening degree sensor 22 and target torque. The processor 32 refers to any one of the control maps to determine the target torque in accordance with the accelerator opening degree detected by the accelerator opening degree sensor 22. The target torque is a target value of torque generated at the input shaft 14a by the power of the internal combustion engine E and the power of the electric motor M. To be specific, the target torque defined by each control map corresponds to total target torque of the internal combustion engine E and the electric motor M.

Figure 5:
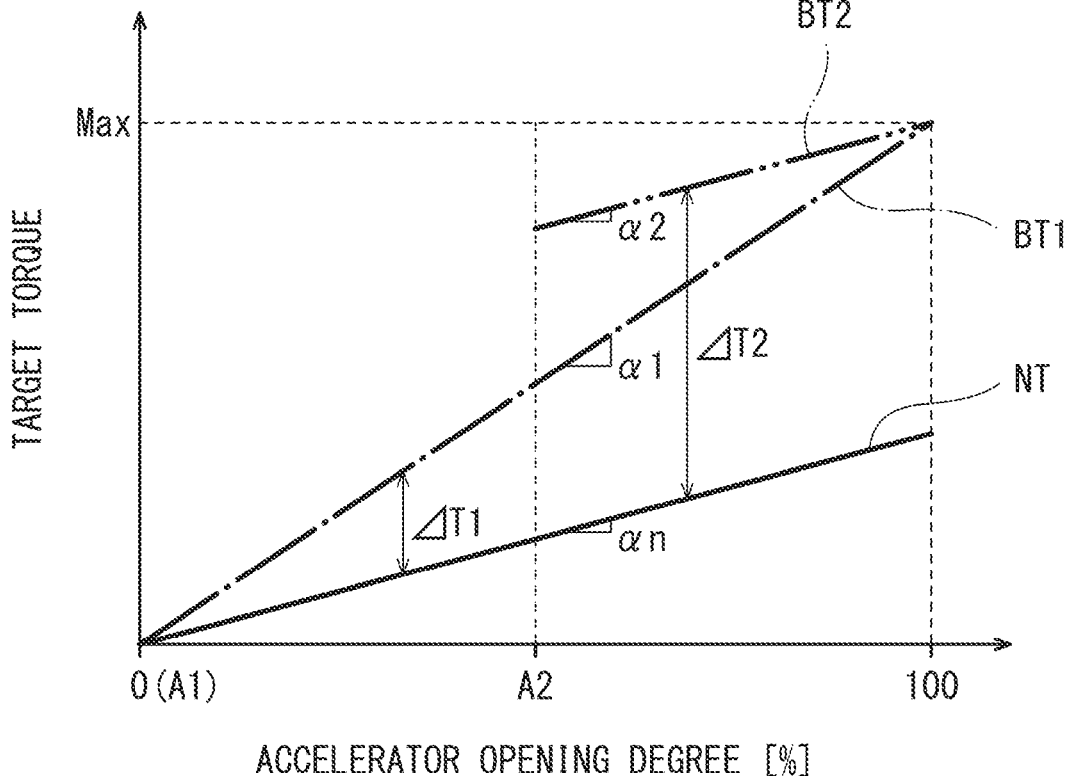
FIG. 5 is a graph for explaining control maps.

FIG. 5 is a graph for explaining the control maps. As shown in FIG. 5, each control map defines a correspondence relation between the accelerator opening degree and the target torque. A solid line NT indicates normal torque that is the target torque defined by the normal control map. A one-dot chain line BT1 indicates first boost torque that is the target torque defined by the first boost control map. A two-dot chain line BT2 indicates second boost torque that is the target torque defined by the second boost control map.

As shown by the solid line NT, according to the normal control map that is referred to when the boost request is not being generated, the target torque increases as the accelerator opening degree increases. When the processor 32 does not receive the boost request, the processor 32 determines the target torque corresponding to the accelerator opening degree as normal torque NT in accordance with the normal control map and controls the internal combustion engine E and the electric motor M based on the determined target torque. The normal control map of the present embodiment is defined such that when the accelerator opening degree is zero, the target torque is zero. The normal control map is defined such that the target torque increases as the accelerator opening degree increases from zero. For example, as shown in the graph of FIG. 5, the normal torque NT is shown by such a linear line that the target torque increases at a predetermined constant change rate αn (inclination) in accordance with the increase in the accelerator opening degree.

The processor 32 determines in accordance with a rule predetermined in a program whether the traveling mode should be set to the EV mode or the HEV mode. The processor 32 can determine in accordance with a selection operation of the mode selection switch 30 whether the traveling mode should be set to the EV mode or the HEV mode. The processor 32 may determine the traveling mode based on a vehicle state including at least one of the remaining amount of the battery 11, a fuel remaining amount of the fuel tank 8, the temperature of the electric motor M, or the temperature of the battery 11.

In accordance with the determined traveling mode, the processor 32 determines a percentage of torque to be generated by the internal combustion engine E and a percentage of torque to be generated by the electric motor M in the target torque which has been determined with reference to the normal control map. To be specific, based on the target torque and the traveling mode, the processor 32 determines engine target torque indicating individual target torque of the internal combustion engine E and motor target torque indicating individual target torque of the electric motor M.

As shown by the one-dot chain line BT1, when the processor 32 receives the boost request under a below-described first condition, the processor 32 determines the target torque in accordance with the first boost control map. Specifically, when the processor 32 receives the boost request under the below-described first condition, the processor 32 determines, as the target torque, first boost torque BT1 obtained by adding first additional torque $\Delta T1$ to the normal torque NT. The first boost control map may be referred to when the accelerator opening degree is a predetermined first opening degree threshold A1 or less. The first opening degree threshold A1 is, for example, a value of not less than 0% and less than 15%, preferably a value of not less than 0% and less than 10%. The first opening degree threshold A1 may be a value of more than 0% such that an acceleration request of the rider can be determined in consideration of a play of the right grip 6a that is an accelerator manipulation element.

When the accelerator opening degree is large, the first additional torque $\Delta T1$ that is a difference between the first boost torque BT1 and the normal torque NT becomes larger than that when the accelerator opening degree is small. For example, the first additional torque $\Delta T1$ increases in accordance with the increase in the accelerator opening degree. For example, when the accelerator opening degree is zero, the first additional torque $\Delta T1$ is zero.

In the present embodiment, the first additional torque $\Delta T1$ increases at a predetermined constant change rate $\beta$ (inclination) in accordance with the increase in the accelerator opening degree. In other words, as shown in FIG. 5, a change rate $\alpha 1$ of the first boost torque BT1 with respect to the increase in the accelerator opening degree is set to be larger than the change rate an of the normal torque NT with respect to the increase in the accelerator opening degree ($\alpha 1 > \alpha n$, $\alpha 1 = \alpha n + \beta$). As with the normal torque NT, regarding the first boost torque BT1, the target torque is set to be zero (an intercept is zero) when the accelerator opening degree is zero.

As shown by the two-dot chain line BT2, when the processor 32 receives the boost request under a below-described second condition, the processor 32 determines the target torque in accordance with the second boost control map. Specifically, when the processor 32 receives the boost request under the below-described second condition, the processor 32 determines, as the target torque, second boost torque BT2 obtained by adding second additional torque $\Delta T2$ to the normal torque NT. The second boost control map may be referred to when the accelerator opening degree is larger than a predetermined second opening degree threshold A2. The second opening degree threshold A2 is set to be larger than the first opening degree threshold A1. For example, it is preferable that the second opening degree threshold A2 be set to the accelerator opening degree in the situation where it is estimated that the acceleration state by the vehicle start is terminated. The second opening degree threshold A2 is, for example, a value of more than 0% and less than 100%, preferably a value of more than 10% and less than 90%, more preferably a value of more than 20% and less than 80%, further preferably a value of more than 30% and less than 70%.

In the present embodiment, the second additional torque $\Delta T2$ is set to a constant value regardless of the increase in the accelerator opening degree. Under the below-described second condition, the second additional torque $\Delta T2$ that is a difference between the second boost torque BT2 and the normal torque NT is constant both when the accelerator opening degree is large and when the accelerator opening degree is small. In other words, as shown in FIG. 5, a change rate $\alpha 2$ of the second boost torque BT2 with respect to the increase in the accelerator opening degree is set to the same value as the change rate an of the normal torque NT with respect to the increase in the accelerator opening degree ($\alpha 2 = \alpha n$).

In the present embodiment, each of the first additional torque $\Delta T1$ and the second additional torque $\Delta T2$ is added to the target torque of the electric motor M. The first boost control map may separately include the information of the normal torque NT and the information of the first additional torque $\Delta T1$. The second boost control map may separately include the information of the normal torque NT and the information of the second additional torque $\Delta T2$. Thus, the boost control with excellent responsiveness is realized. Each of the first additional torque $\Delta T1$ and the second additional torque $\Delta T2$ may be added to both of the target torque of the internal combustion engine E and the target torque of the electric motor M in a distributed manner or may be added to the target torque of the internal combustion engine E.

The amount of increase of the first boost torque BT1 per unit increase of the accelerator opening degree is larger than the amount of increase of the second boost torque BT2 per unit increase of the accelerator opening degree. To be specific, the change rate $\alpha 1$ of the first boost torque BT1 with respect to the increase in the accelerator opening degree is larger than the change rate $\alpha 2$ of the second boost torque BT2 with respect to the increase in the accelerator opening degree. For example, the first additional torque $\Delta T1$ increases in accordance with the increase in the accelerator opening degree, whereas the second additional torque $\Delta T2$ is constant regardless of the accelerator opening degree. The second additional torque $\Delta T2$ may increase in accordance with the increase in the accelerator opening degree.

The second additional torque $\Delta T2$ at the time point of the generation of the boost request is set to be larger than the first additional torque $\Delta T1$ at the time point of the generation of the boost request. The time point of the generation of the boost request in the first boost control is a time point when the accelerator opening degree is the predetermined first opening degree threshold A1 or less. The time point of the generation of the boost request in the second boost control is a time point when the accelerator opening degree is larger than the second opening degree threshold A2. A maximum value of the first additional torque $\Delta T1$ is set to be not more than a maximum value of the second additional torque $\Delta T2$. A minimum value of the first additional torque $\Delta T1$ is set to be not more than a minimum value of the second additional torque $\Delta T2$.

The first additional torque $\Delta T1$ when the accelerator opening degree is the second opening degree threshold A2 is smaller than the second additional torque $\Delta T2$ when the accelerator opening degree is the second opening degree threshold A2. In the present embodiment, when the accelerator opening degree is 100%, the first additional torque ΔT1 becomes the same as the second additional torque ΔT2. However, when the accelerator opening degree is a value of less than 100%, the first additional torque ΔT1 may become the same as the second additional torque ΔT2. Moreover, even when the accelerator opening degree is 100%, the first additional torque ΔT1 may remain smaller than the second additional torque ΔT2.

FIG. 5 shows an example in which regarding the lines NT, BT1, and BT2, the target torque increases proportionally and linearly in accordance with the increase in the accelerator opening degree. However, the present embodiment is not limited to such linear increase as described below. Regarding at least one of the line NT, the line BT1, or the line BT2, the target torque may increase nonlinearly in accordance with the increase in the accelerator opening degree.

In the present embodiment, each of the first boost control map and the second boost control map changes in accordance with the change gear ratios set in the transmission 14. To be specific, the additional torque of the boost control differs depending on the selected change gear ratio. For example, the additional torque of the boost control may be set to be larger as the change gear ratio is lower (the speed stage is higher). Since the target torque is determined in accordance with the change gear ratio as above, both the traveling feeling and the acceleration request can be satisfied.

Moreover, each of the first boost control map and the second boost control map may change in accordance with the rotational frequency of the input shaft 14a. In the HEV mode, each of the first boost control map and the second boost control map may change in accordance with the rotational frequency of the engine E. In the EV mode, each of the first boost control map and the second boost control map may change in accordance with the rotational frequency of the electric motor M. Each of the first boost control map and the second boost control map may change in accordance with the vehicle speed.

Moreover, each of the first boost torque BT1 and the second boost torque BT2 may be corrected by at least one of the acceleration of the motorcycle 1, the vehicle speed, a time change rate of the acceleration request value, a current position of the motorcycle 1, traveling road surface estimation, correction corresponding to the preference of the rider, the temperature of the electric motor M, the temperature of the battery 11, the remaining amount of the battery 11, intake pressure of the internal combustion engine E, or the like.

A maximum value of the first boost torque BT1 and a maximum value of the second boost torque BT2 may be different from each other. For example, the maximum value of the first boost torque BT1 may be larger than the maximum value of the second boost torque BT2. Moreover, when the rotational frequency of the input shaft 14a or the vehicle speed is less than a predetermined value, the maximum value of the first boost torque BT1 may be larger than the maximum value of the second boost torque BT2, whereas when the rotational frequency of the input shaft 14a or the vehicle speed is the predetermined value or more, the maximum value of the second boost torque BT2 may be larger than the maximum value of the first boost torque BT1.

Figure 6:
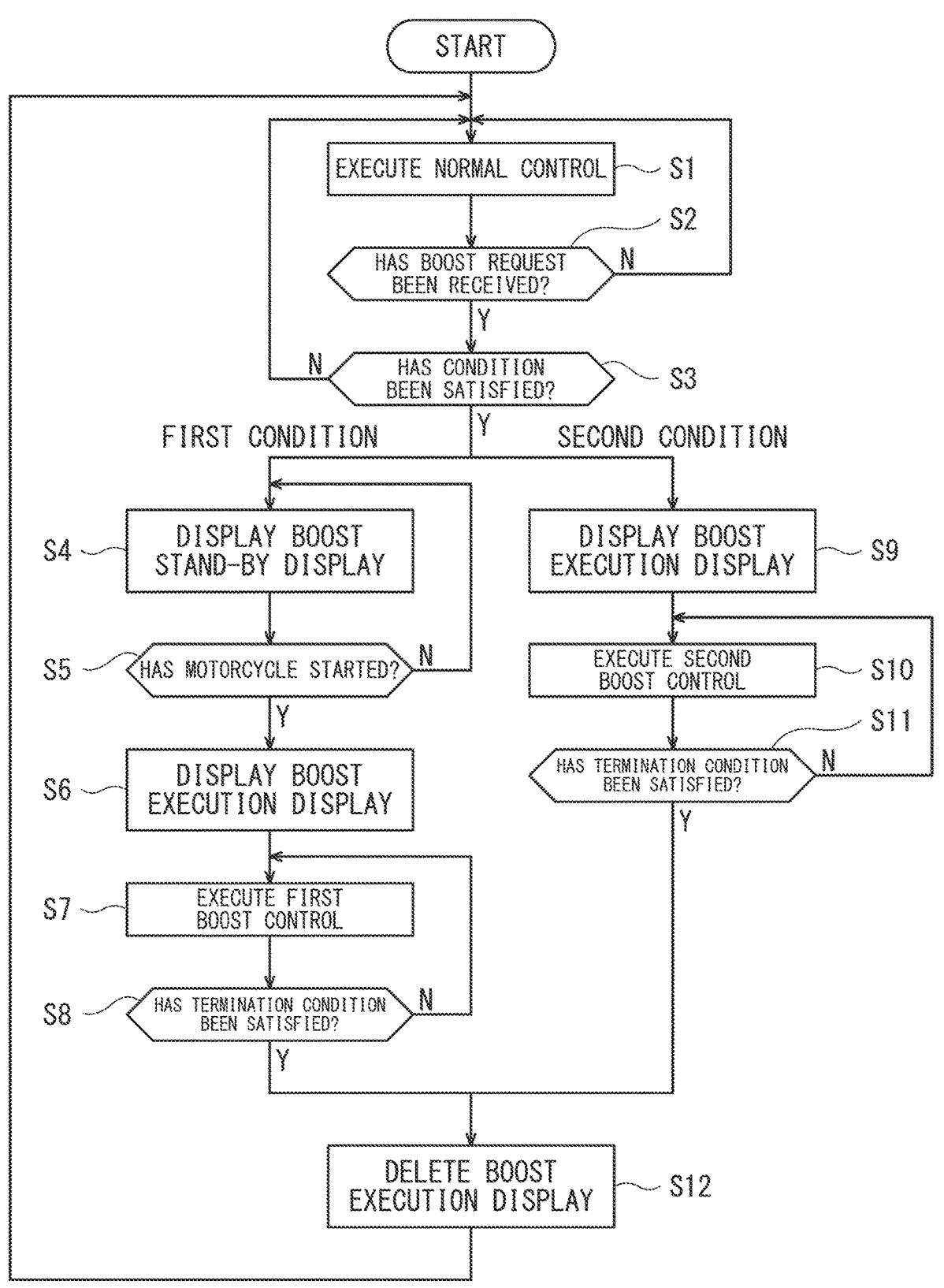
FIG. 6 is a flowchart for explaining control of a vehicle controller of FIG. 4.

FIG. 6 is a flowchart for explaining the control of the vehicle controller 12 of FIG. 4. The following will describe processing of the vehicle controller 12 based on the flow of FIG. 6 with suitable reference to the components shown in FIG. 4, etc. When the rider turns on the power supply of the motorcycle 1, and this starts the supply of the electric power to the vehicle controller 12, the processor 32 determines, as the normal torque NT in accordance with the normal control map, the target torque corresponding to the accelerator opening degree detected by the accelerator opening degree sensor 22 (Step S1). The processor 32 controls the internal combustion engine E and the electric motor M based on the obtained target torque and the selected traveling mode (normal control).

The processor 32 determines whether or not the processor 32 has received the boost request from the boost switch 21 (Step S2). When the processor 32 has not received the boost request (No in Step S2), the processor 32 continuously executes the normal control. When the processor 32 has received the boost request (Yes in Step S2), the processor 32 determines whether the first condition or the second condition is satisfied (Step S3).

The first condition includes a condition that it has been determined that the motorcycle 1 is in a stop state. For example, when at least one of a condition that it has been determined that the vehicle speed is a predetermined first vehicle speed threshold or less or a condition that it has been determined that the acceleration request amount of the rider is a predetermined first acceleration request threshold or less is satisfied, the processor 32 determines that the motorcycle 1 is in the stop state, i.e., the first condition has been satisfied. Specifically, the vehicle speed is the traveling speed detected by the vehicle speed sensor 23. The acceleration request amount is the accelerator opening degree detected by the accelerator opening degree sensor 22. The first acceleration request threshold is the above-described first opening degree threshold A1.

The first vehicle speed threshold is, for example, a value of not less than 0 km/h and not more than 15 km/h, preferably a value of not less than 0 km/h and not more than 10 km/h, further preferably a value of not less than 0 km/h and not more than 5 km/h. In consideration of a detection error of the vehicle speed sensor 23 and the like, the first vehicle speed threshold may be a value within a set range of more than 0 km/h.

In the present embodiment, when at least one of a condition that it has been determined that the accelerator opening degree is the first opening degree threshold A1 or less or the condition that it has been determined that the vehicle speed is the first vehicle speed threshold or less is satisfied, the processor 32 determines that the motorcycle 1 is in the stop state. The first condition may include only the condition that it has been determined that the vehicle speed is the first vehicle speed threshold or less, only the condition that it has been determined that the accelerator opening degree is the first opening degree threshold A1 or less, or a condition that both of the above conditions have been satisfied. Instead of or in addition to the condition that it has been determined that the accelerator opening degree is the first opening degree threshold A1 or less, the first condition may include a condition that it has been determined that the rotational frequency of the internal combustion engine E or the rotational frequency of the electric motor M is a first rotational frequency threshold or less. The first rotational frequency threshold may be, for example, a value of not less than 0 rpm and not more than 1,500 rpm.

The second condition includes a condition that it has been determined that the motorcycle 1 is in a predetermined traveling state. For example, in the present embodiment, when at least one of a condition that it has been determined that the acceleration request amount of the rider is larger than a predetermined second acceleration request threshold or a condition that it has been determined that the vehicle speed is higher than a predetermined second vehicle speed threshold is satisfied, the processor 32 determines that the motorcycle 1 is in the predetermined traveling state. The second acceleration request threshold is set to a value larger than the first acceleration request threshold. Specifically, the acceleration request amount is the accelerator opening degree detected by the accelerator opening degree sensor 22, and the second acceleration request threshold is the second opening degree threshold A2. The second vehicle speed threshold is set to a value larger than the first vehicle speed threshold. The second vehicle speed threshold is, for example, a value of not less than 5 km/h and not more than 100 km/h, preferably a value of not less than 20 km/h and not more than 100 km/h, further preferably a value of not less than 40 km/h and not more than 100 km/h.

In the present embodiment, when both of a condition that it has been determined that the accelerator opening degree is larger than the second opening degree threshold A2 and a condition that it has been determined that the vehicle speed is higher than the second vehicle speed threshold are satisfied, the processor 32 determines that the motorcycle 1 is in the predetermined traveling state.

The second condition may include only the condition that it has been determined that the vehicle speed is higher than the second vehicle speed threshold or may include only the condition that it has been determined that the accelerator opening degree is larger than the second opening degree threshold A2. Instead of or in addition to the condition that it has been determined that the accelerator opening degree is larger than the second opening degree threshold, the second condition may include a condition that it has been determined that the rotational frequency of the internal combustion engine E or the rotational frequency of the electric motor M is larger than the second rotational frequency threshold. The second rotational frequency threshold is set to a value large than the first rotational frequency threshold. The second rotational frequency threshold may be, for example, a value of not less than 200 rpm and not more than 5,000 rpm. The second rotational frequency threshold may be the same as the first rotational frequency threshold.

In the present embodiment, determining that the vehicle is in the predetermined traveling state includes determining that vehicle-start acceleration has been terminated. In this case, the second condition may be a condition by which it can be determined that the vehicle-start acceleration has been terminated. The second condition may be a condition other than the condition related to the vehicle speed or the accelerator opening degree. For example, the above-described predetermined traveling state may include at least one of: a state where the change gear ratio of the transmission 14 of the vehicle has reached a change gear ratio (for example, a low reduction ratio) at which the vehicle-start acceleration is supposed to be terminated; a state where the increase in the acceleration of the vehicle has been terminated; a state where a travel distance since the vehicle start has exceeded a predetermined value; a state where the boost state by the vehicle start has been terminated; or the like. For example, in a state where the first condition is satisfied, and the first boost control is being executed, the second condition is regarded as being not satisfied. Therefore, even when the vehicle speed is higher than the second vehicle speed threshold or even when the accelerator opening degree is larger than the second opening degree threshold, the first boost control is continuously executed. Thus, the rapid increase in the torque during the vehicle-start acceleration can be suppressed.

Each of the first condition and the second condition may include at least one of a condition that the remaining amount of the battery 11 is a predetermined value or more, a condition that the temperature of the battery 11 is less than a predetermined value, or a condition that the temperature of the electric motor M is less than a predetermined value. Each of the first condition and the second condition may include a condition that the motorcycle 1 is not cornering or a condition that the rider is not braking.

Figure 7:
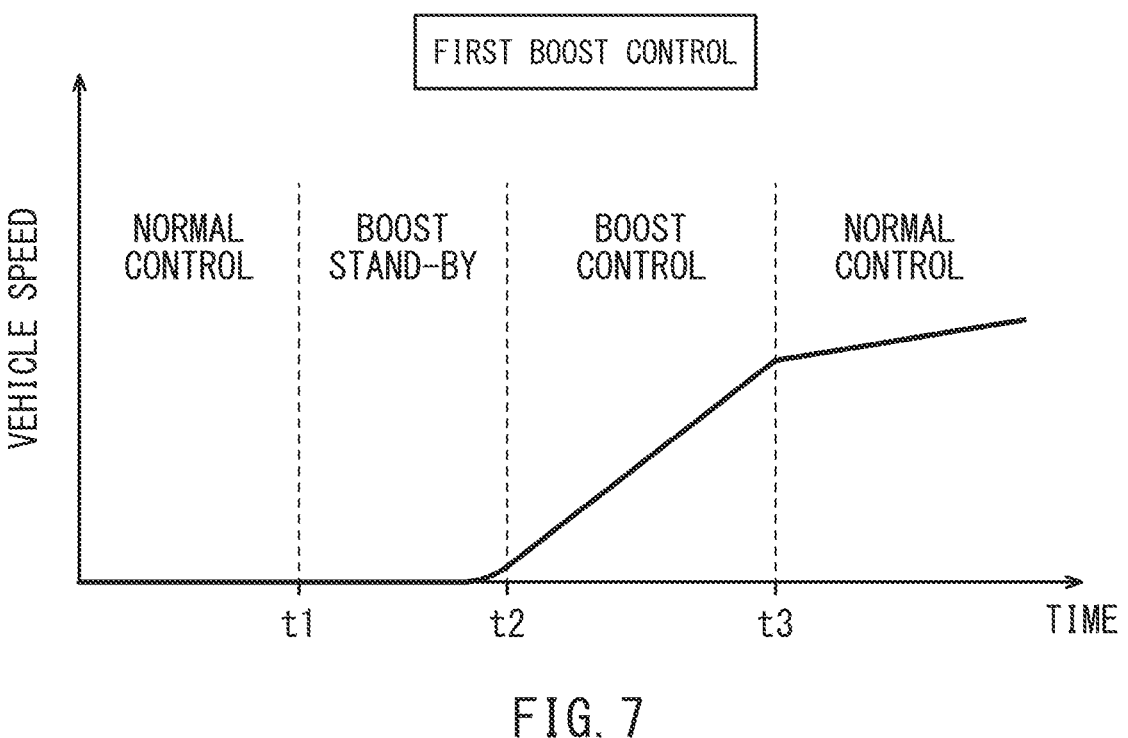
FIG. 7 is a graph showing a relationship between a vehicle speed and a time which are related to first boost control of FIG. 6.

When the first condition and the second condition are not satisfied (No in Step S3), the processor 32 continues the normal control (Step S1). In Step S3, when the first condition is satisfied (time t1 in FIG. 7), the processor 32 controls the display 7 such that the display 7 displays a boost stand-by display (Step S4). In other words, the processor 32 informs of a stand-by state indicating that preparation for starting the boost control is finished. The boost stand-by display is, for example, the flashing of the boost display B. At this time, since the accelerator opening degree is the first opening degree threshold A1 or less, the processor 32 does not start the first boost control yet. To be specific, since the motorcycle 1 is in the stop state, the processor 32 does not start the first boost control yet. Since the boost display B flashes while the motorcycle 1 is in the stop state, the rider can understand that the motorcycle 1 is in a stand-by state before the start of the boost control.

In a state where the boost stand-by display is displayed, the processor 32 determines whether or not the motorcycle 1 has started (Step S5). For example, when the processor 32 detects that the accelerator opening degree has become larger than the first opening degree threshold A1, the processor 32 determines that the motorcycle 1 has started (time t2 in FIG. 7). When the processor 32 detects that the vehicle speed has become higher than the first vehicle speed threshold, the processor 32 may determine that the motorcycle 1 has started. As described above, regarding the accelerator opening degree, the first opening degree threshold A1 is smaller than the second opening degree threshold A2. Moreover, regarding the vehicle speed, the first vehicle speed threshold is smaller than the second vehicle speed threshold. When the processor 32 detects that the rotational frequency of the internal combustion engine E or the rotational frequency of the electric motor M has become larger than the first rotational frequency threshold instead of or in addition to detecting that the accelerator opening degree has become larger than the first opening degree threshold, the processor 32 may determine that the motorcycle 1 has started.

When the processor 32 determines that the motorcycle 1 has not started (No in Step S5), the processor 32 returns to Step S4. When the processor 32 determines that the motorcycle 1 has started (Yes in Step S5), the processor 32 controls the display 7 such that the display 7 displays boost execution display in order to inform that the boost control is being executed (Step S6), and the processor 32 executes the first boost control (Step S7). The boost execution display is, for example, the light-on of the boost display B. Determining that the motorcycle 1 has started is a trigger of the start of the first boost control. For example, the trigger of the start of the first boost control is to detect at least one of the accelerator opening degree which has exceeded the first opening degree threshold A1, the vehicle speed which has exceeded the first vehicle speed threshold, or the rotational frequency of the engine E which has exceeded the first rotational frequency threshold. The first boost control is control in which the first boost torque BT1 of FIG. 5 is the target torque. In the first boost control, the first additional torque ΔT1 increases as the accelerator opening degree increases. Therefore, smooth driving feeling and satisfactory acceleration can be obtained. In other words, in a vehicle-start initial stage in which the accelerator opening degree is small, a rapid increase in the target torque can be prevented, and shock at the time of the vehicle start can be eased.

The processor 32 determines whether or not a boost termination condition has been satisfied (Step S8). When the processor 32 determines that the boost termination condition has been satisfied (time t3 in FIG. 7), the processor 32 controls the display 7 such that the display 7 deletes the boost execution display in order to inform of the termination of the boost control (Step S12), and the processor 32 terminates the first boost control and returns to the normal control (Step S1). Deleting the boost execution display is, for example, setting the boost display B to a light-off state.

The boost termination condition may include a first termination condition that it has been detected that the boost switch 21 has been switched to the OFF position. To be specific, while the boost switch 21 is at the ON position, the processor 32 continues the first boost control. When the boost switch 21 returns to the OFF position, the processor 32 terminates the first boost control and returns to the normal control. In addition to the operation of the boost switch 21, the first termination condition may include at least one of the operation of the brake, the operation of the transmission 14, or the operation of the clutch 19. As above, the boost termination condition may include detecting the operation indicating that the acceleration state is terminated by the operation of the rider.

The boost termination condition may include a second termination condition that it has been detected that the accelerator opening degree has become a predetermined termination threshold or less. The termination threshold is, for example, a value of not less than 0% and not more than 30%, preferably a value of not less than 0% and not more than 20%, further preferably a value of not less than 0% and not more than 10%. To be specific, when the rider operates the right grip 6a toward a deceleration side, the processor 32 terminates the first boost control and returns to the normal control.

The boost termination condition may include a third termination condition that it has been detected that a count parameter that increases as a duration time of the first boost control increases has reached a predetermined limit value. The count parameter may be, for example, the duration time itself of the first boost control. The count parameter may be the temperature of the electric motor M or the temperature of the battery 11. Moreover, the count parameter may be a current amount that is an accumulated value of the current supplied during the boost control. By setting the third termination condition as above, the boost acceleration can be performed while preventing damages of the electric motor and the battery 11. When any one of the first to third termination conditions is satisfied, the processor 32 determines that the boost termination condition has been satisfied.

Figure 8:
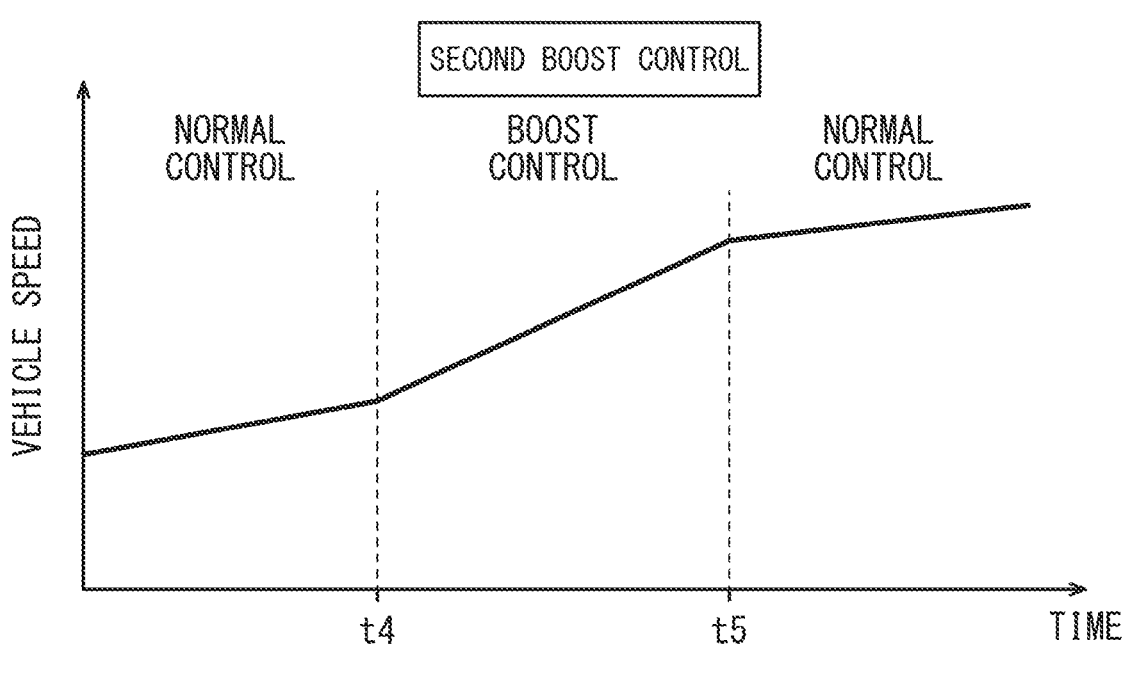
FIG. 8 is a graph showing a relationship between a vehicle speed and a time which are related to second boost control of FIG. 6.

In Step S3, when the second condition is satisfied (time t4 in FIG. 8), the processor 32 controls the display 7 such that the display 7 displays the boost execution display in order to inform that the boost control is being executed (Step S9), and the processor 32 executes the second boost control (Step S10). The boost execution display is, for example, the light-on of the boost display B. The second boost control is control in which the second boost torque BT2 of FIG. 5 is the target torque. The second boost control is started while the motorcycle 1 is traveling, and the additional torque $\Delta T2$ at an initial stage is larger than that in the first boost control. Therefore, the acceleration request of the rider can be properly satisfied.

The processor 32 determines whether or not the boost termination condition has been satisfied (Step S11). The boost termination condition in Step S11 is the same as the boost termination condition in Step S8. When the processor 32 determines that the boost termination condition has been satisfied (time t5 in FIG. 8), the processor 32 controls the display 7 such that the display 7 deletes the boost execution display in order to inform of the termination of the boost control (Step S12), and the processor 32 terminates the second boost control and returns to the normal control (Step S1). Deleting the boost execution display is, for example, setting the boost display B to the light-off state.

According to the above-described configuration, the boost torque BT1 and the boost torque BT2 can be changed depending on the situation when the boost request has been generated. Therefore, the boost request can be satisfied while realizing the appropriate driving feeling depending on the situation. Such configuration is preferably used in a lightweight straddled vehicle whose acceleration change by the boost is large.

Figure 9:
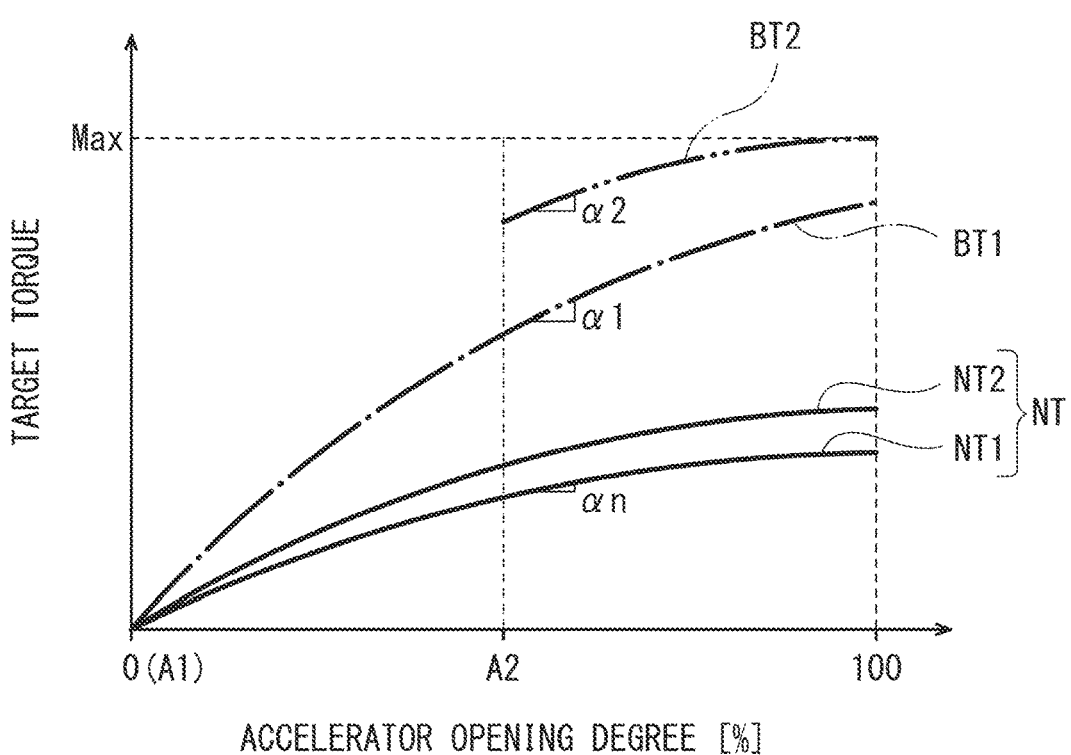
FIG. 9 is a graph for explaining a first modified example of the control maps of FIG. 5.

FIG. 9 is a graph for explaining a first modified example of the control maps of FIG. 5. As shown in FIG. 9, at least one of the change rate an of the normal torque NT, the change rate $\alpha1$ of the first boost torque BT1, or the change rate $\alpha2$ of the second boost torque BT2 may change in accordance with a change in the accelerator opening degree. For example, the normal torque NT, the first boost torque BT1, and the second boost torque BT2 may curvedly increase in accordance with the increase in the accelerator opening degree. In FIG. 9, each of the normal torque NT, the first boost torque BT1, and the second boost torque BT2 has a curved shape that is convex upward, but may have a curved shape that is convex downward. All of the normal torque NT, the first boost torque BT1, and the second boost torque BT2 do not have to have the curved shape, and at least one of the normal torque NT, the first boost torque BT1, or the second boost torque BT2 may have the curved shape. Moreover, the number of normal control maps is not limited to one and may be plural. For example, there may be normal torque NT1 in a first traveling mode and normal torque NT2 in a second traveling mode in which the target torque is higher than that in the first traveling mode.

Figure 10:
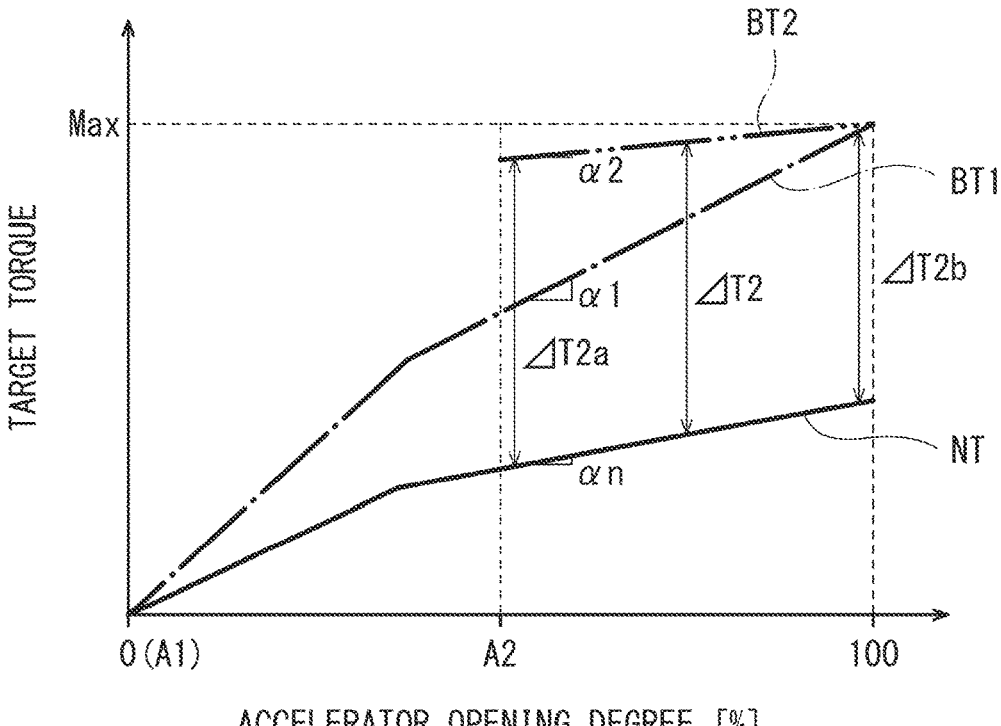
FIG. 10 is a graph for explaining a second modified example of the control maps of FIG. 5.

FIG. 10 is a graph for explaining a second modified example of the control maps of FIG. 5. As shown in FIG. 10, the change rate an (inclination) of the normal torque NT as the target torque with respect to the increase in the accelerator opening degree and the change rate $\alpha1$ (inclination) of the first boost torque BT1 as the target torque with respect to the increase in the accelerator opening degree may change. For example, when the accelerator opening degree is in a first region, the change rate of the target torque with respect to the increase in the accelerator opening degree is larger than that when the accelerator opening degree is in a second region in which the accelerator opening degree is larger than that in the first region. The second additional torque $\Delta T2$ does not have to be constant and may change in accordance with a change in the accelerator opening degree. For example, the second additional torque $\Delta T2$ may decrease in accordance with the increase in the accelerator opening degree ($\Delta T2a > \Delta T2b$). In contrast, the second additional torque $\Delta T2$ may increase in accordance with the increase in the accelerator opening degree. The change rate $\alpha2$ (inclination) of the second boost torque BT2 as the target torque with respect to the increase in the accelerator opening degree may also change.

Figure 11:
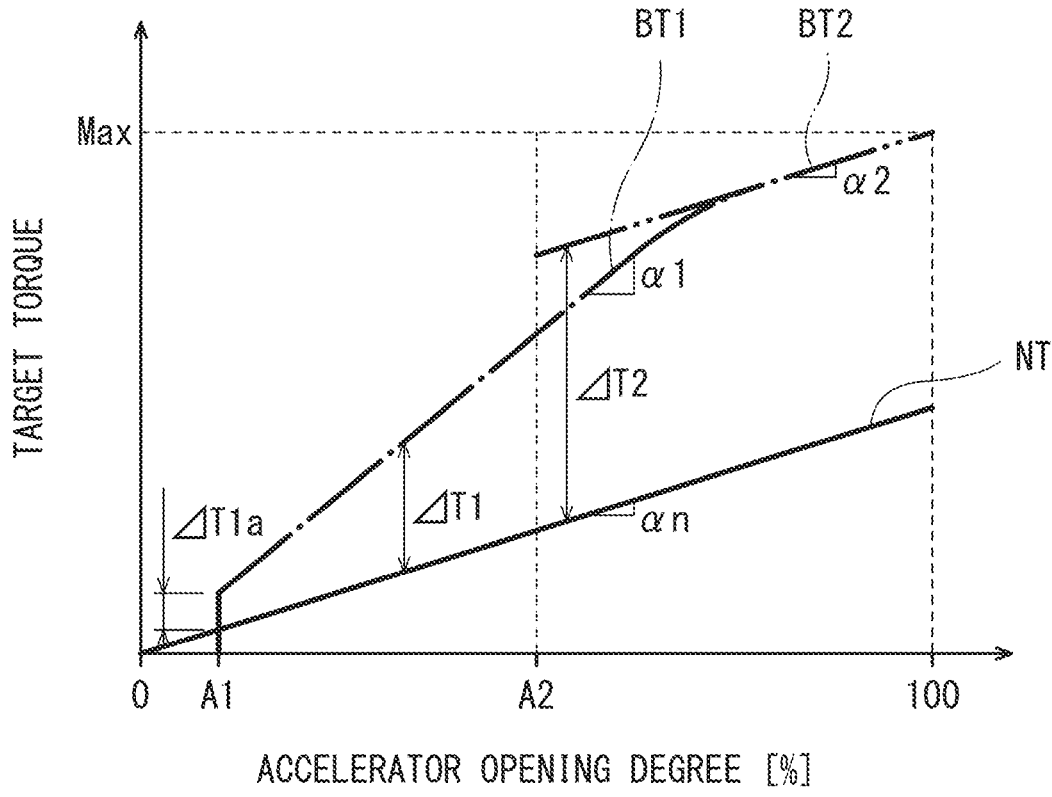
FIG. 11 is a graph for explaining a third modified example of the control maps of FIG. 5.

FIG. 11 is a graph for explaining a third modified example of the control maps of FIG. 5. As shown in FIG. 11, an initial value $\Delta T1a$ of the first additional torque $\Delta T1$ when it has been determined that the accelerator opening degree has exceeded the opening degree threshold A1 and the motorcycle 1 has started may be a value larger than zero. To be specific, when it has been determined that the motorcycle 1 has started, the first boost torque BT1 may increase stepwisely, not smoothly. Moreover, in a region that is part of a range in which the accelerator opening degree is 0% to 100%, the amount of increase of the first boost torque BT1 per unit increase of the accelerator opening degree does not have to be larger than the amount of increase of the second boost torque BT2 per unit increase of the accelerator opening degree. Specifically, in a range in which the accelerator opening degree is a predetermined value or more, for example, in a region in which the accelerator opening degree is close to 100%, the first boost torque BT1 may be the same as the second boost torque BT2. Moreover, the change rate $\alpha1$ of the first boost torque BT1 during the increase in the accelerator opening degree may change smoothly.

The technology of the present disclosure is not limited to the above-described embodiment. For example, the boost request may be generated by the program of the vehicle controller 12, not by the boost switch 21. The boost switch 21 is not limited to a push button switch and may be anything as long as the rider can input the boost command. For example, a pedal operation performed by the rider with his/her foot may be the input of the boost command. Moreover, instead of the boost switch 21, a sound inputter to which the boost request can be input may be included.

The first boost rule and the second boost rule may be rules that correct the normal control map. For example, the first boost rule may be a first additional map that defines a correspondence relation between the accelerator opening degree and the first additional torque $\Delta T1$. To be specific, in the first boost control, the target torque may be torque obtained by adding the first additional torque $\Delta T1$ acquired from the first additional map to the normal torque NT acquired from the normal control map. Similarly, the second boost rule may be a second additional map that defines a correspondence relation between the accelerator opening degree and the second additional torque $\Delta T2$. To be specific, in the second boost control, the target torque may be torque obtained by adding the second additional torque $\Delta T2$ acquired from the second additional map to the normal torque NT acquired from the normal control map. Moreover, each of the first boost rule and the second boost rule may be a formula that defines correction of a value obtained from the normal control map or a correction coefficient map that defines a correction coefficient by which a value obtained from the normal control map is multiplied. All of the normal rule, the first boost rule, and the second boost rule may be formulas.

The first condition may include at least one of a condition that it has been determined that the motorcycle 1 is cornering, a condition that it has been determined that the motorcycle 1 is on a predetermined slippery road surface, or a condition that it has been determined that the motorcycle 1 is at an intersection. The second condition may include at least one of a condition that it has been determined that the transmission 14 is performing a speed change, a condition that it has been determined that the motorcycle 1 is traveling on an upward slope, or a condition that it has been determined that the motorcycle 1 is traveling on an expressway.

The first acceleration request threshold and the second acceleration request threshold may be the same as each other. To be specific, the first opening degree threshold A1 and the second opening degree threshold A2 may be the same as each other. The first vehicle speed threshold and the second vehicle speed threshold may be the same as each other. The second condition may be a condition including only a condition that the first condition is not satisfied.

The foregoing has described an example in which the above configuration is applied to a hybrid vehicle. However, the present embodiment is not limited to this, and the above configuration may be applied to an electric vehicle (BEV) or an engine vehicle. The layout of the driving source that drives the driving wheel may be another layout. For example, the driving source may be an in-wheel motor. An electric motor as the driving source may be located at a swing arm. For example, the transmission and the clutch may be omitted.

The display 7 switches the boost display B among the light-off, the light-on, and the flashing to inform of the state of the boost control. However, the present embodiment is not limited to this, and the display mode may be changed in accordance with the state of the boost control. For example, the color of the boost display B may be changed in accordance with the state of the boost control. A display region on a screen image may be changed in accordance with the state of the boost control. The state of the boost control may be informed to the rider by sound or vibration instead of or in addition to the display. The display mode may be made different between the first boost state and the second boost state. Thus, the rider can recognize whether the first boost control is being executed or the second boost control is being executed.

The above-described content of the first condition is one example, and the first condition may be a condition by which it can be determined that the vehicle is in a stop state. Whether or not the first condition is satisfied may be determined based on a factor other than the vehicle speed and the acceleration request amount. For example, whether or not the vehicle is in a stop state may be determined based on at least one of the brake operation, the clutch operation, the transmission operation, or the state of the side stand. Moreover, whether or not the vehicle is in a stop state may be determined based on the satellite positioning sensor or the gyro sensor. To be specific, whether or not the vehicle is in a stop state may be determined based on the posture of the vehicle body, the time change of the vehicle posture, the vehicle acceleration, or the time change rate of the vehicle acceleration. The first condition may include detecting the start of slow-speed traveling due to a downward slope, stepping-on of the rider, or the like.

Moreover, in the present embodiment, the second condition is not limited to the condition that it has been determined that the vehicle-start acceleration has been terminated. The second condition may be set to a condition that acceleration different from the vehicle-start acceleration is being requested. For example, the second condition may be a condition that it has been estimated that overtaking acceleration at the time of a lane change is being requested, a condition that it has been estimated that acceleration at the time of a corner exit is being requested, or a condition that it has been estimated that acceleration at the time of traveling on a slope is being requested. The second condition may be a condition that it has been estimated that acceleration by speed change operation in the situation different from the situation of the vehicle-start acceleration is being requested. By setting the second condition as above, acceleration corresponding to the situation can be realized.

Moreover, in order to realize the acceleration corresponding to the situation, the second acceleration request threshold and the second vehicle speed threshold may be corrected by the change gear ratio, the acceleration of the motorcycle 1, the time change rate of the acceleration request value, the current position of the motorcycle 1, the traveling road surface estimation, the correction corresponding to the preference of the rider, the temperature of the electric motor M, the temperature of the battery 11, the remaining amount of the battery 11, the intake pressure of the internal combustion engine E, or the like.

The foregoing has described the embodiment as an example of the technology disclosed in the present application. However, the technology in the present disclosure is not limited to this and is applicable to embodiments in which modifications, replacements, additions, omissions, and the like have been suitably made. Moreover, a new embodiment may be prepared by combining the components described in the above embodiment. For example, some of components or methods in one embodiment or one modified example may be applied to another embodiment or another modified example. Some components in an embodiment may be separated from the other components in the embodiment and arbitrarily extracted. Furthermore, the components shown in the attached drawings and the detailed explanations include not only components essential to solve the problems but also components for exemplifying the above technology and not essential to solve the problems.

The functionality of the elements disclosed herein may be implemented using circuitry or processing circuitry which includes general purpose processors, special purpose processors, integrated circuits, ASICs ("Application Specific Integrated Circuits"), FPGAs ("Field Programmable Gate Arrays"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The following aspects disclose preferred embodiments.

First Aspect

A vehicle controller that controls a vehicle, the vehicle including:

a driving wheel;

an accelerator opening degree sensor that detects an acceleration request amount of a rider; and a prime mover that generates torque to be transmitted to the driving wheel in accordance with the acceleration request amount detected by the accelerator opening degree sensor, the vehicle controller including processing circuitry configured to control the prime mover, wherein:

when a boost request is not being generated, the processing circuitry determines, as target torque of the prime mover in accordance with a normal rule, normal torque which corresponds to the acceleration request amount;

when the boost request is generated under a first condition, the processing circuitry determines, as the target torque of the prime mover in accordance with a first boost rule, first boost torque obtained by adding first additional torque to the normal torque; and when the boost request is generated under a second condition different from the first condition, the processing circuitry determines, as the target torque in accordance with a second boost rule different from the first boost rule, second boost torque obtained by adding second additional torque to the normal torque.

According to this configuration, the boost torque can be changed in accordance with the situation when the boost request has been generated. Therefore, the boost request can be satisfied while realizing the appropriate driving feeling depending on the the situation.

Second Aspect

The vehicle controller according to the first aspect, wherein:

the first condition includes a condition that it has been determined that the vehicle is in a stop state; and the second condition includes a condition that it has been determined that the vehicle is in a predetermined traveling state.

According to this configuration, the boost rule is made different between two situations different from each other. Thus, the boost request can be satisfied while realizing the appropriate driving feeling.

Third Aspect

The vehicle controller according to the first or second aspect, wherein:

the first condition includes at least one of a condition that it has been determined that the acceleration request amount is a first acceleration request threshold or less or a condition that it has been determined that a vehicle speed is a first vehicle speed threshold or less; and the second condition includes at least one of a condition that the acceleration request amount is larger than a second acceleration request threshold that is set to the first acceleration request threshold or more or a condition that the vehicle speed is higher than a second vehicle speed threshold that is set to the first vehicle speed threshold or more.

According to this configuration, a rule that determines the boost torque under the first condition in which the acceleration request amount is small and/or the vehicle speed is low and a rule that determines the boost torque under the second condition in which the acceleration request amount is large and/or the vehicle speed is high are different from each other. Therefore, the boost of the torque can be appropriately performed in accordance with a factor that influences the driving feeling at the start of the boost control.

Fourth Aspect

The vehicle controller according to any one of the first to third aspects, wherein the first additional torque is set to increase in accordance with an increase in the acceleration request amount.

According to this configuration, when the boost request is generated under the first condition, the additional torque increases as the acceleration request amount of the rider increases. Therefore, satisfactory acceleration can be obtained while realizing the smooth driving feeling under the first condition.

Fifth Aspect

The vehicle controller according to the fourth aspect, wherein the first boost rule and the second boost rule are set such that the amount of increase of the first boost torque per unit increase of the acceleration request amount is larger than the amount of increase of the second boost torque per unit increase of the acceleration request amount.

According to this configuration, the increase in the torque in accordance with the increase in the acceleration request amount is changed depending on the situation. Thus, the boost request can be satisfied while realizing the appropriate driving feeling.

Sixth Aspect

The vehicle controller according to any one of the first to fifth aspects, wherein the first boost rule and the second boost rule are set such that the second additional torque at the time of the generation of the boost request under the second condition is larger than the first additional torque at the time of the generation of the boost request under the first condition.

According to this configuration, when the boost request is generated under the second condition, the additional torque at the initial stage becomes relatively large. Therefore, the acceleration request of the rider can be properly satisfied.

Seventh Aspect

The vehicle controller according to any one of the first to sixth aspects, wherein:

the first condition includes a condition that it has been determined that the vehicle is in a stop state; and when the boost request is generated under the first condition, the processing circuitry makes an informer output information indicating that boost control is standing by.

According to this configuration, when the vehicle is in a stop state, the rider can be informed that the boost control is in a stand-by state. Thus, the recognition of the rider can be improved.

Eighth Aspect

A vehicle controller that controls a vehicle, the vehicle including:

a driving wheel;

an accelerator opening degree sensor that detects an acceleration request amount of a rider;

a prime mover that generates torque to be transmitted to the driving wheel in accordance with the acceleration request amount detected by the accelerator opening degree sensor; and a display, the vehicle controller including processing circuitry configured to control the prime mover, wherein:

when a boost request is not being generated, the processing circuitry determines, as target torque of the prime mover in accordance with a normal rule, normal torque which corresponds to the acceleration request amount;

when the boost request is generated under a condition that it has been determined that the vehicle is in a stop state, the processing circuitry makes an informer output information indicating that boost control is standing by; and when it has been determined that the vehicle has started traveling in a state where the informer is outputting the information, the processing circuitry determines, as the target torque in accordance with a boost rule, boost torque obtained by adding additional torque to the normal torque.

According to this configuration, when the vehicle is in a stop state, the rider can be informed that the boost control is in a stand-by state. Thus, the recognition of the rider can be improved.

Ninth Aspect

A method of controlling a vehicle, the vehicle including:

a driving wheel;

an accelerator opening degree sensor that detects an acceleration request amount of a rider; and a prime mover that generates torque to be transmitted to the driving wheel in accordance with the acceleration request amount detected by the accelerator opening degree sensor, the method including:

when a boost request is not being generated, determining, as target torque of the prime mover in accordance with a normal rule, normal torque which corresponds to the acceleration request amount;

when the boost request is generated under a first condition, determining, as the target torque in accordance with a first boost rule, first boost torque larger than the normal torque; and when the boost request is generated under a second condition different from the first condition, determining, as the target torque in accordance with a second boost rule different from the first boost rule, second boost torque that is larger than the normal torque and different from the first boost torque.

According to this method, the boost torque can be changed in accordance with the situation when the boost request has been generated. Therefore, the boost request can be satisfied while realizing the appropriate driving feeling depending on the situation.

Tenth Aspect

A vehicle control program causing at least one processor to execute the vehicle control method according to the ninth aspect.

What is claimed is:

1. A vehicle comprising:

a driving wheel;

an accelerator opening degree sensor that detects an acceleration request amount of a rider;

a prime mover that generates torque to be transmitted to the driving wheel in accordance with the acceleration request amount detected by the accelerator opening degree sensor;

a boost switch to which the rider inputs a boost command; and a vehicle controller comprising processing circuitry configured to control the prime mover, wherein:

when a boost request is not being generated, the processing circuitry determines, as target torque of the prime mover in accordance with a normal rule, normal torque which corresponds to the acceleration request amount;

when the boost request is generated under a first condition, the processing circuitry determines, as the target torque of the prime mover in accordance with a first boost rule, first boost torque obtained by adding first additional torque to the normal torque;

when the boost request is generated under a second condition different from the first condition, the processing circuitry determines, as the target torque in accordance with a second boost rule different from the first boost rule, second boost torque obtained by adding second additional torque to the normal torque;

the boost request is generated by an operation of the boost switch by the rider;

the first condition includes a condition that it has been determined that the vehicle is in a stop state;

the second condition includes a condition that it has been determined that vehicle-start acceleration of the vehicle has been terminated; and the first boost rule and the second boost rule are set such that the second additional torque at a time of the generation of the boost request under the second condition is larger than the first additional torque at a time of the generation of the boost request under the first condition.

2. The vehicle according to claim 1, wherein:

the first condition further includes at least one of a condition that it has been determined that the acceleration request amount is a first acceleration request threshold or less or a condition that it has been determined that a vehicle speed is a first vehicle speed threshold or less; and the second condition further includes at least one of a condition that the acceleration request amount is larger than a second acceleration request threshold that is set to the first acceleration request threshold or more or a condition that the vehicle speed is higher than a second vehicle speed threshold that is set to the first vehicle speed threshold or more.

3. The vehicle according to claim 1, wherein the first additional torque is set to increase in accordance with an increase in the acceleration request amount.

4. The vehicle according to claim 3, wherein the first boost rule and the second boost rule are set such that an amount of increase of the first boost torque per unit increase of the acceleration request amount is larger than an amount of increase of the second boost torque per unit increase of the acceleration request amount.

5. The vehicle according to claim 1, wherein when the boost request is generated under the first condition, the processing circuitry makes an informer output information indicating that boost control is standing by.

6. A method of controlling a vehicle, the vehicle including:

a driving wheel;

an accelerator opening degree sensor that detects an acceleration request amount of a rider;

a prime mover that generates torque to be transmitted to the driving wheel in accordance with the acceleration request amount detected by the accelerator opening degree sensor; and a boost switch to which the rider inputs a boost command, the method comprising:

when a boost request is not being generated, determining, as target torque of the prime mover in accordance with a normal rule, normal torque which corresponds to the acceleration request amount;

when the boost request is generated under a first condition, determining, as the target torque in accordance with a first boost rule, first boost torque larger than the normal torque; and when the boost request is generated under a second condition different from the first condition, determining, as the target torque in accordance with a second boost rule different from the first boost rule, second boost torque that is larger than the normal torque and different from the first boost torque, wherein:

the boost request is generated by an operation of the boost switch by the rider;

the first condition includes a condition that it has been determined that the vehicle is in a stop state;

the second condition includes a condition that it has been determined that vehicle-start acceleration of the vehicle has been terminated; and the first boost rule and the second boost rule are set such that a difference between the normal torque and the second boost torque at a time of the generation of the boost request under the second condition is larger than a difference between the normal torque and the first boost torque at a time of the generation of the boost request under the first condition.

7. The vehicle according to claim 1, wherein:

the first condition further includes a condition that the vehicle starts; and the second condition further includes a condition different from an acceleration state by a vehicle start.

8. The vehicle according to claim 1, wherein:

the normal rule is a normal control map;

the first boost rule is a first boost control map;

the second boost rule is a second boost control map;

when the boost request is generated under the first condition and it is determined that the vehicle has started, the processing circuitry executes a first boost control in accordance with the first boost control map until a predetermined boost termination condition is satisfied; and when the boost request is generated under the second condition, the processing circuitry executes a second boost control in accordance with the second boost control map until the boost termination condition is satisfied.

9. The vehicle according to claim 8, further comprising a transmission that changes a speed of a power output from the prime mover, wherein the first boost control map and the second boost control map respectively change in accordance with change gear ratios set in the transmission.

10. The vehicle according to claim 1, wherein:

the first additional torque increases in accordance with increase in the acceleration request amount; and the second additional torque is constant regardless of the acceleration request amount.

11. The vehicle according to claim 1, wherein the first condition further includes at least one of:

a condition that it has been determined that the vehicle is cornering;

a condition that it has been determined that the vehicle is on a predetermined slippery road surface; or a condition that it has been determined that the vehicle is at an intersection.

12. The vehicle according to claim 11, further comprising:

a transmission that changes a speed of a power output from the prime mover;

a clutch that is located between the prime mover and the transmission;

a brake; and a battery, wherein the boost termination condition includes at least one of:

a condition that it has been determined that the boost switch has been switched to an OFF position;

a condition that it has been determined that the brake has been operated;

a condition that it has been determined that the transmission is operated;

a condition that it has been determined that the clutch has been operated;

a condition that it has been determined that the acceleration request amount has become a predetermined termination threshold or less;

a condition that it has been determined that a duration time of the first boost control has reached a predetermined limit value;

a condition that it has been determined that a temperature of the prime mover or the battery has reached a predetermined limit value; or a condition that it has been determined that an accumulated value of a current supplied during the boost control has reached a predetermined limit value.

13. A vehicle controller that controls a vehicle, the vehicle including:

a driving wheel;

an accelerator opening degree sensor that detects an acceleration request amount of a rider; and a prime mover that generates torque to be transmitted to the driving wheel in accordance with the acceleration request amount detected by the accelerator opening degree sensor, the vehicle controller comprising processing circuitry configured to control the prime mover, wherein:

when a boost request is not being generated, the processing circuitry determines, as target torque of the prime mover in accordance with a normal rule, normal torque which corresponds to the acceleration request amount;

when the boost request is generated under a vehicle-start condition, the processing circuitry determines, as the target torque of the prime mover in accordance with a vehicle-start boost rule, vehicle-start boost torque obtained by adding first additional torque to the normal torque;

when the boost request is generated under a vehicle-travelling condition, the processing circuitry determines, as the target torque in accordance with a vehicle-travelling boost rule different from the vehicle-start boost rule, vehicle-travelling boost torque obtained by adding second additional torque to the normal torque, the vehicle-travelling condition being a condition that an acceleration state by a vehicle start is terminated or a condition different from the acceleration state; and the vehicle-start boost rule and the vehicle-travelling boost rule are set such that the second additional torque is larger than the first additional torque when the first additional torque and the second additional torque correspond to the same acceleration request amount.

14. The vehicle controller according to claim 13, wherein the vehicle-travelling condition is a condition that a parameter which is the acceleration request amount, a vehicle speed, or a rotational frequency of the prime mover is larger than a predetermined threshold when the boost request is generated.

15. The vehicle controller according to claim 13, wherein:

the vehicle-start condition is a condition that the acceleration request amount or a vehicle speed is a first threshold or less when the boost request is generated; and the vehicle-travelling condition is a condition that the acceleration request amount or the vehicle speed is a second threshold or more when the boost request is generated.

16. The vehicle controller according to claim 13, wherein a first threshold of an accelerator opening degree as the acceleration request amount is set to a value of not less than 0%.

17. The vehicle controller according to claim 14, wherein the parameter is the vehicle speed, and the predetermined threshold is set to a value of not less than 5 km/h.

18. The vehicle controller according to claim 13, wherein the vehicle-travelling condition is:

a condition that it has been estimated that overtaking acceleration at a time of a lane change is being requested, a condition that it has been estimated that acceleration at a time of a corner exit is being requested, a condition that it has been estimated that acceleration at a time of traveling on a slope is being requested, or a condition that it has been estimated that acceleration by a speed change operation in a situation different from a situation of a vehicle-start acceleration is being requested.

* * * * *